United States Patent
Yamagishi et al.

(10) Patent No.: US 6,662,817 B2
(45) Date of Patent: Dec. 16, 2003

(54) GAS-LINE SYSTEM FOR SEMICONDUCTOR-MANUFACTURING APPARATUS

(75) Inventors: Takayuki Yamagishi, Tama (JP); Masaei Suwada, Tama (JP)

(73) Assignee: ASM Japan K.K., Tama (JP)

( * ) Notice: Subject to any disclaimer, the term of this patent is extended or adjusted under 35 U.S.C. 154(b) by 131 days.

(21) Appl. No.: 09/967,727

(22) Filed: Sep. 28, 2001

(65) Prior Publication Data
US 2002/0038669 A1 Apr. 4, 2002

(30) Foreign Application Priority Data
Oct. 4, 2000 (JP) .......................... 2000-304840

(51) Int. Cl.[7] .............................. G05D 11/13
(52) U.S. Cl. ................ 137/9; 137/101; 137/101.19; 137/597
(58) Field of Search .................. 137/101, 101.19, 137/597, 9

(56) References Cited

U.S. PATENT DOCUMENTS

| | | | |
|---|---|---|---|
| 5,339,636 A | * 8/1994 | Donnelly et al. | 137/100 |
| 5,730,801 A | 3/1998 | Tepman et al. | |
| 5,826,607 A | * 10/1998 | Knutson et al. | 137/1 |
| 5,855,681 A | 1/1999 | Maydan et al. | |
| 5,951,772 A | * 9/1999 | Matsuse et al. | 118/723 R |

FOREIGN PATENT DOCUMENTS

| | | |
|---|---|---|
| JP | 10-30183 | 2/1998 |
| JP | 10-154739 | 6/1998 |

OTHER PUBLICATIONS

U.S. patent application Ser. No. 09/932,790, Yamagishi et al., filed Aug. 17, 2001.

* cited by examiner

*Primary Examiner*—Stephen M. Hepperle
(74) *Attorney, Agent, or Firm*—Knobbe Martens Olson & Bear, LLP

(57) ABSTRACT

A gas-line system used for a semiconductor-manufacturing apparatus with at least two reactors, includes at least one gas source; a flow-divider means including an input port on the primary side, which receives a source gas from the gas source, and an output port on the secondary side, which outputs an inputted source gas by equally distributing it. The input port on the primary side is connected with the gas source and the output port on the secondary side is connected with the reactors; and one exhaust pump for exhausting gases within the reactors, which is connected with the reactors. It is desirable that the gas-line system is provided between the reactors and the exhaust pump, and an APC is included for controlling pressure for each reactor.

20 Claims, 3 Drawing Sheets

GAS-LINE SYSTEM FOR SEMICONDUCTOR-MANUFACTURING APPARATUS

BACKGROUND OF THE INVENTION

1. Field of the Invention

The present invention relates to a gas-line system for a semiconductor-manufacturing apparatus, and it particularly relates to a gas flow-divider used for a gas-line system for single-wafer-processing type semiconductor-manufacturing apparatus and a method for using the same.

2. Description of the Related Art

Conventionally, for a substrate-processing apparatus, there is a single-wafer-processing type and a batch-processing type. With the single-wafer-processing type, a single reactor processes one wafer at a time. With the batch-processing type, a single reactor processes multiple wafers at a time.

Because a batch-processing type processes multiple wafers in a single reactor, its productivity is high. With batch processing, however, the thickness and quality of a thin film formed on a substrate are not uniform and this often becomes a problem. To improve quality and the uniformity of film thickness, use of a conventional single-wafer-processing type substrate processing apparatus is effective. In the case of a conventional single-wafer-processing type substrate-processing apparatus in which multiple reactors are installed with a common transfer chamber, each reactor independently possesses a gas line and a vacuum line and independently performs deposition.

If attempting to increase productivity using a conventional single-wafer-processing type substrate-processing apparatus, the number of reactors increases and the same number of vacuum elements including gas lines and vacuum pumps becomes necessary. As a result, costs per reactor increase and the footprint increases at the same time.

Furthermore, conventionally, for a method for dividing a gas flow into two reactors from one gas line, there is a method using a T-shaped joint. In this case, however, there is a drawback that a gas excessively flows into a reactor having lower pressure. As a result, distribution balance is lost and consequently process balance between two reactors worsens.

SUMMARY OF THE INVENTION

Therefore, an object of the present invention is to provide a gas-line system realizing low costs and a small footprint.

Another object of the present invention is to provide a gas-line system which promotes labor saving for gas lines and exhaust lines.

Yet another object of the present invention is to provide a gas-line system realizing stable processing and high throughput and a method for using the same.

To achieve the above-mentioned objects, a gas-line system for a semiconductor-manufacturing apparatus according to the present invention may comprise the following embodiments:

The present invention includes various aspects. For example, in an embodiment, the gas-line system comprises: (a) a source gas line derived from at least one gas source; (b) at least two branch gas lines leading to the respective reactors; and (c) a flow divider for equally distributing the gas passing through the source gas line into each branch gas line, said flow divider comprising (i) an input port connected to the source gas line wherein a gas passes therethrough at a primary side flow rate, and (ii) at least two output ports connected to the respective branch gas lines wherein a gas passes through each branch gas line at a secondary side flow rate.

Although the flow controller does not detect the primary side flow rate, by using the flow meter, the primary side flow rate is detected and a signal corresponding to one half of the flow rate (if two reactors are used) is outputted to each flow controller, instantly balancing the flow rate on the secondary side between the branch source gas lines at a maximum level. Accordingly, using such a simple structure, the total of the secondary side flows can be equal to the primary side flow while equally diverting the primary side flow into each secondary side flow.

In the above the signal of the primary side flow rate and the signal of the secondary side flow rate can either be analog signals or digital signals.

In the above, the flow divider may comprise: (I) at least two flow controllers for setting the respective secondary side flow rates, disposed at the respective output ports: (II) a flow meter for detecting the primary side flow rate, disposed at the input port; and (III) a signal processor for receiving a signal of the primary side flow rate from the flow meter and outputting a signal of the secondary side flow rate to each flow controller to equally set each secondary side flow rate.

In another embodiment, the gas-line system may comprise: (i) a source gas line derived from at least one gas source; (ii) at least two branch gas lines leading to the respective reactors; (iii) a diverging point where the branch gas lines branch off from the source gas line; (iv) a flow rate detecting device provided on the source gas line; (v) at least two flow rate adjusting devices provided on the respective branch gas lines; and (vi) a controlling device which sets a setpoint of each flow rate adjusting device based on a signal from the flow rate detecting device to equally distribute a gas passing through the source gas line into each branch gas line. In the above, the flow rate detecting device may be a mass flow meter, the flow rate adjusting device may be a mass flow controller, and the controlling device may be a signal processor.

In the above, at least two gas sources may be connected to the source gas line, wherein said system further comprises at least two origin source gas lines connecting between the respective gas sources and the source gas line, and a merging point where the origin source gas lines merge into the source gas line.

Additionally, the gas-line system may further comprise an exhaust pump for exhausting each reactor, disposed downstream of the reactors, wherein a pressure control valve is provided between each reactor and the exhaust pump to control gas flow of each reactor.

According to another aspect of the present invention, a method is provided for equally distributing a source gas into at least two reactors for semiconductor processing. The method comprises the steps of: (i) detecting the flow rate of the source gas derived from a gas source; (ii) calculating an equally divided flow rate for the respective reactors; (iii) diverging the source gas into each reactor; and (iv) setting a flow rate between the diverging point and each reactor at the equally divided flow rate.

In the above, the method may further comprise controlling the pressure of each reactor by a single exhaust pump and a pressure control valve provided between each reactor and the exhaust pump.

Further, in the above, the detected flow rate of the source gas may be processed into an analog signal which is used to calculate the equally divided flow rate, and based on an analog signal of the equally divided flow rate, the flow rate is set downstream of the diverging point. Alternatively, the detected flow rate of the source gas may be processed into a digital signal which is used to calculate the equally divided flow rate, and based on a digital signal of the equally divided flow rate, the flow rate is set downstream of the diverging point.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

Figure 1:
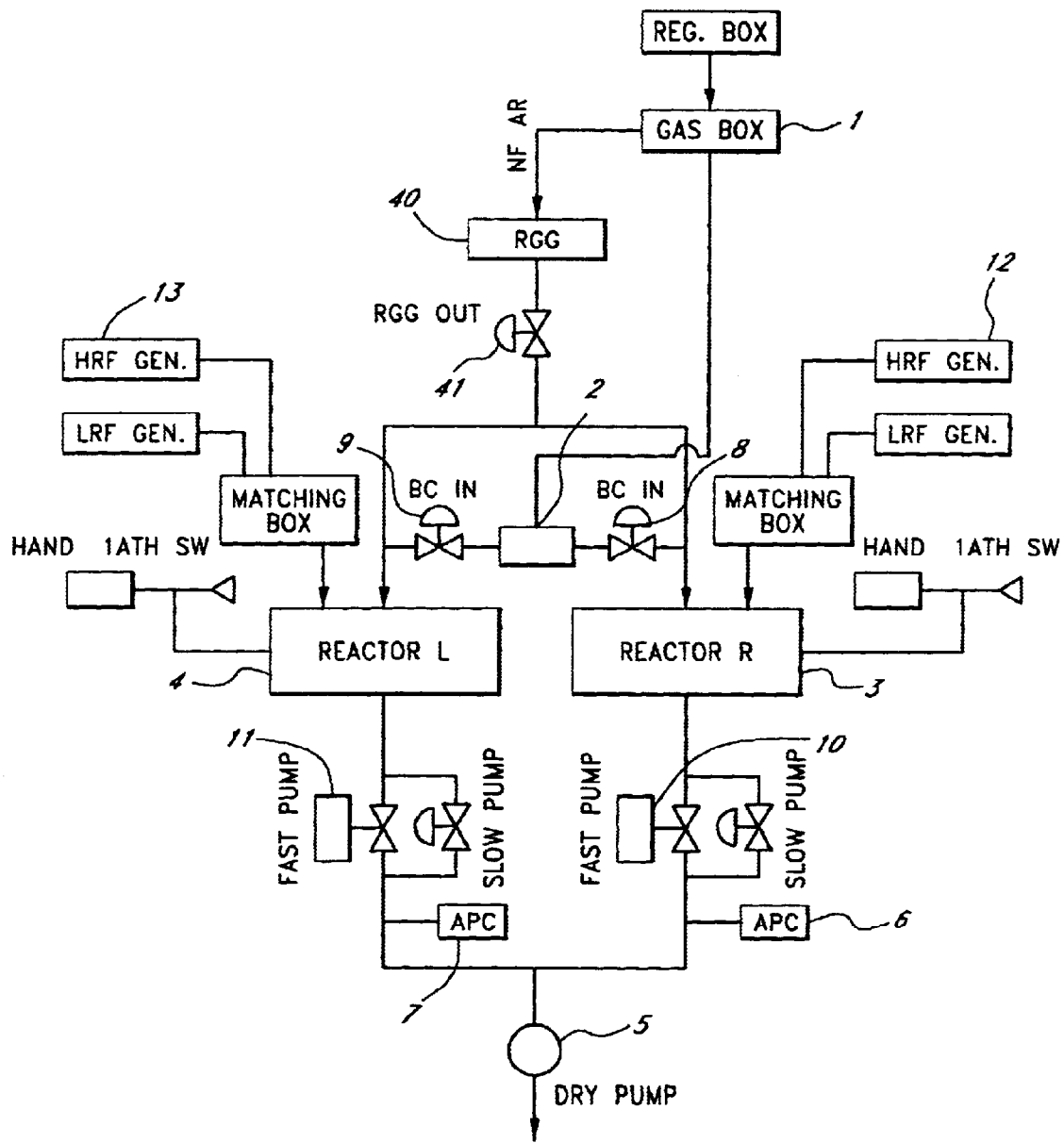
FIG. 1 is a diagram showing an embodiment of a gas-line system according to the present invention.

Explanation of symbols used is as follows: 1: Gas source; 2: Flow-divider means; 3, 4: Reactors; 5: Exhaust pump; 6, 7: APC; 8, 9: Gas stop valves; 10, 11: Vacuum exhaust valves; 12, 13: RF generators.

DETAILED DESCRIPTION OF THE PREFERRED EMBODIMENT

As described above, the present invention includes various embodiments. In an embodiment, a gas-line system used for a semiconductor-manufacturing apparatus with at least two reactors comprises (i) at least one gas source, (ii) a flow divider, which comprises an input port on the primary side, which receives source gases from a gas source, and an output port on the secondary side, which outputs source gases inputted by equally distributing them, and wherein the input port on the primary side is connected with a gas source and the output port is connected with each reactor, and (iii) one exhaust pump connected with the reactors for exhausting gases inside the reactors.

Specifically, a flow divider may comprise one mass flow meter connected with an input port on the primary side, two mass flow controllers provided on each line branching off from the mass flow meter, and an analog signal converter electrically connected between the mass flow meter and the mass flow controllers.

Alternatively, a flow divider can comprise one digital mass flow meter connected with an input port on the primary side, two digital mass flow controllers provided on each line branching off from the digital mass flow meter, an electrically connected digital signal processor provided between the digital mass flow meter and digital mass flow controllers.

Preferably, the system concerned is provided between reactors and an exhaust pump and includes APCs (auto pressure control adjustable butterfly valves) for controlling pressure for each reactor.

In another embodiment, a method for using a gas-line system according to the present invention comprises a process for controlling the flow rate of each source gas using a mass flow controller on the primary side of a flow divider, a process for equally distributing source gases to two output ports on the secondary side, a process for bringing in source gases to each reactor, and a process for controlling pressure within each reactor to a desired pressure using an APC.

Further specifically, a process for equally distributing source gases to two output ports using the flow divider may comprise a process for measuring a flow using a mass flow meter, a process for converting measured values into analog signals, a process for transmitting the signals to each mass flow controller, and a process in which each mass flow controller receives the signals and controls a flow rate at 50% of a flow rate on the primary side.

Further specifically, a process for equally distributing source gases to two output ports using a flow divider may comprise a process for measuring a flow using a digital mass flow meter, a process for converting measured values into digital signals, a process for transmitting the digital signals to each digital mass flow controller, and a process in which each mass flow controller receives the digital signals and controls a flow rate at 50% of a flow rate on the primary side.

The present invention is further described below in detail referring to figures. FIG. 1 shows a preferred embodiment of a gas-line system used for a single-wafer-processing type semiconductor-manufacturing apparatus with two reactors. In the apparatus, because two sheets of semiconductor substrates are processed at the same time, preferably, the apparatus should have two reactors, one gas line and one exhaust line.

A gas-line system of a reactor shown in FIG. 1 includes at least one gas source 1. Specifically, the gas source 1 comprises a gas box possessing a mass flow controller within it.

A flow-divider means 2 comprises an input port on the primary side, which receives a source gas from a gas source 1, an output port on the secondary side, which outputs the inputted source gas by equally distributing it, wherein the input port on the primary side is connected with the gas source 1 and the output port on the secondary side is connected with each reactor 3 and 4.

One gas line of the gas-line system according to the present invention includes a gas source 1, a flow-divider means 2, and gas stop valves 8 and 9 provided for the respective reactors and connected between the flow divider means 2 and each reactor (3 and 4).

One exhaust line of the gas-line system according to the present invention includes one exhaust pump 5 connected with each reactor (3 and 4), APCs 6 and 7 (automatically pressure-controllable adjustable butterfly valves) which are respectively connected between reactors 3 and 4 and the exhaust pump 5 and are provided for the respective reactors (3 and 4), and vacuum exhaust valves 10 and 11 provided for the respective reactors and respectively connected between an APC and the respective reactors (3 and 4). APCs (or exhaust throttle valves) can be available from MKS JAPAN, INC., Tokyo, Japan, such as #252E or #153F.

One exhaust line of a gas-line system according to the present invention includes.

The flow-divider means 2 has a capability to output to the secondary side an equal amount of a gas flow of 0 to 10 SLM inputted to the primary side. Depending on the capacity of a reactor, the maximum capacity of a usable flow divider may vary from 3 SLM to 30 SLM.

Further, in FIG. 1, a gas ($NF_3$, Ar) is supplied from the gas box 1 to both reactor L 4 and reactor R 3 through an RGG (reactive gas generator) 40 and an RGG OUT valve 41. RF power is exerted on each reactor by mixing RF from a high radio frequency generator and RF from a low radio frequency generator using a matching box. Additionally, a monometer (MONO) and a one-atom switch (1ATM SW) are provided for each reactor.

Figure 2:
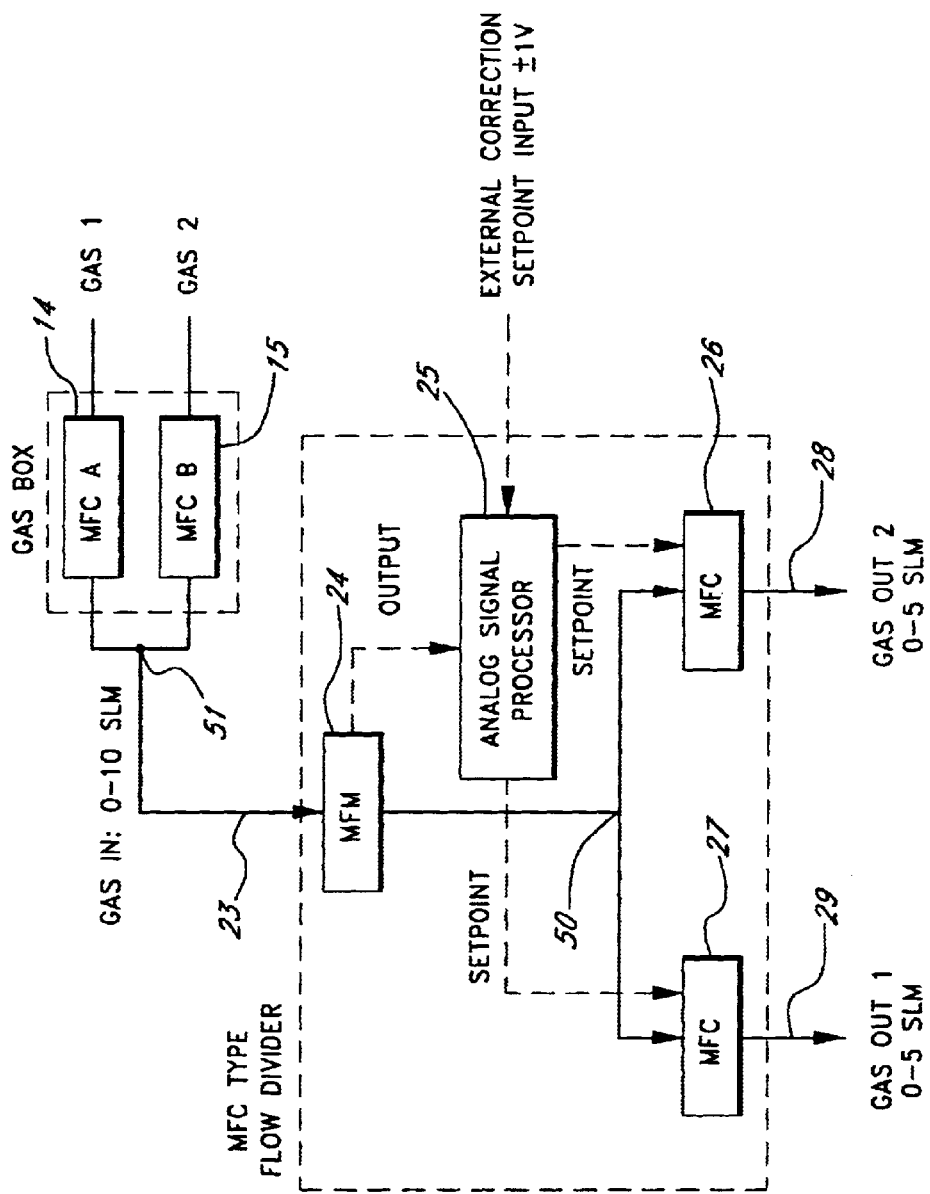
FIG. 2 is a diagram showing the first embodiment of a flow-divider means according to the present invention.

FIG. 2 shows a preferred embodiment of a flow-divider means. A flow-divider means 20 has an input port 23 on the primary side and output ports 28 and 29 on the secondary side. The flow-divider means 20 comprises one mass flow meter 24 (MFM) connected with the input port 23 on the primary side, two mass flow controllers 26 and 27 (MFC) provided respectively on a line branching off from the MFM 24, and an analog signal processor 25 electrically connected between the MFM 24 and the MFCs 26 and 27. Two MFCs 26 and 27 are connected with the output ports 28 and 29 on the secondary side, respectively.

The MFM 24 detects the flow rate on the primary side and outputs an analog signal to the signal processor 25. The signal processor 25 processes the analog signal and outputs an analog signal, which corresponds to one half of the primary side flow rate, to each MFC 26/27. It is possible to divide the primary side flow into two secondary side flows without using the MFM. However, because each MFC 26/27 does not detect the primary side flow rate, i.e., the flow rate upstream of a diverging point 50, it is difficult to determine an appropriate setpoint corresponding to one half of the primary side flow. That is, if the MFCs 26 and 27 are fully opened without using the MFM, similarly to a case where no MFC is used, the secondary side flows outputted from the respective MFCs are influenced by the pressures of the respective secondary sides. Thus, the opening level of each MFC 26/27 must be equally started with a low level and opened little by little until each MFC 26/27 appears to reach a level where both flow rates begin being unbalanced. This process takes time, and thus the responsiveness of the MFCs to changes in the primary side flow rate is very low. By using the MFM 24, the primary side flow rate is detected and a signal corresponding to one half of the flow rate is outputted to each MFC 26/27, instantly balancing the flow rate therebetween at a maximum level. Accordingly, the total of the secondary side flows can be equal to the primary side flow while equally diverting the primary side flow into each secondary side flow.

In the above, as long as the MFM can detect the primary side flow, the MFM can be disposed at any position, and instead of one MFM disposed immediately upstream of the diverging point 50, two MFMs can be disposed on the gas line, GAS 1, and the gas line, GAS 2, upstream of a merging point 51. The analog signal processor calculates the total flow rate on the primary side upon receiving signals from the two MFMs.

Preferably, the MFCs 26 and 27 are normally open. The flow-dividing balance of the MFCs 26 and 27 can be changed by 20%, for example, by externally inputting corrections (±1 V) into the analog signal processor 25, changing the balance of the setpoints (the opening levels) of the MFCs 26 and 27 by up to 20%. In most cases, such a difference in the balance is sufficient to correct an actual imbalance between the MFCs 26 and 27.

To adjust differences residing in MFCs' original characteristics, each MFC may be equipped with an MFM, so that feedback control can be operated.

In the above, the number of gas types is two (GAS 1 and GAS 2). However, simply one gas type or more than two gas types can be constituted in the same way. Similarly, the number of reactors can be more than two, and the system can be constituted in the same way as above.

Additionally, if three devices, an MFM, MFCs, and a signal processor, share the same system, whether they are analog or digital does not matter.

Figure 3:
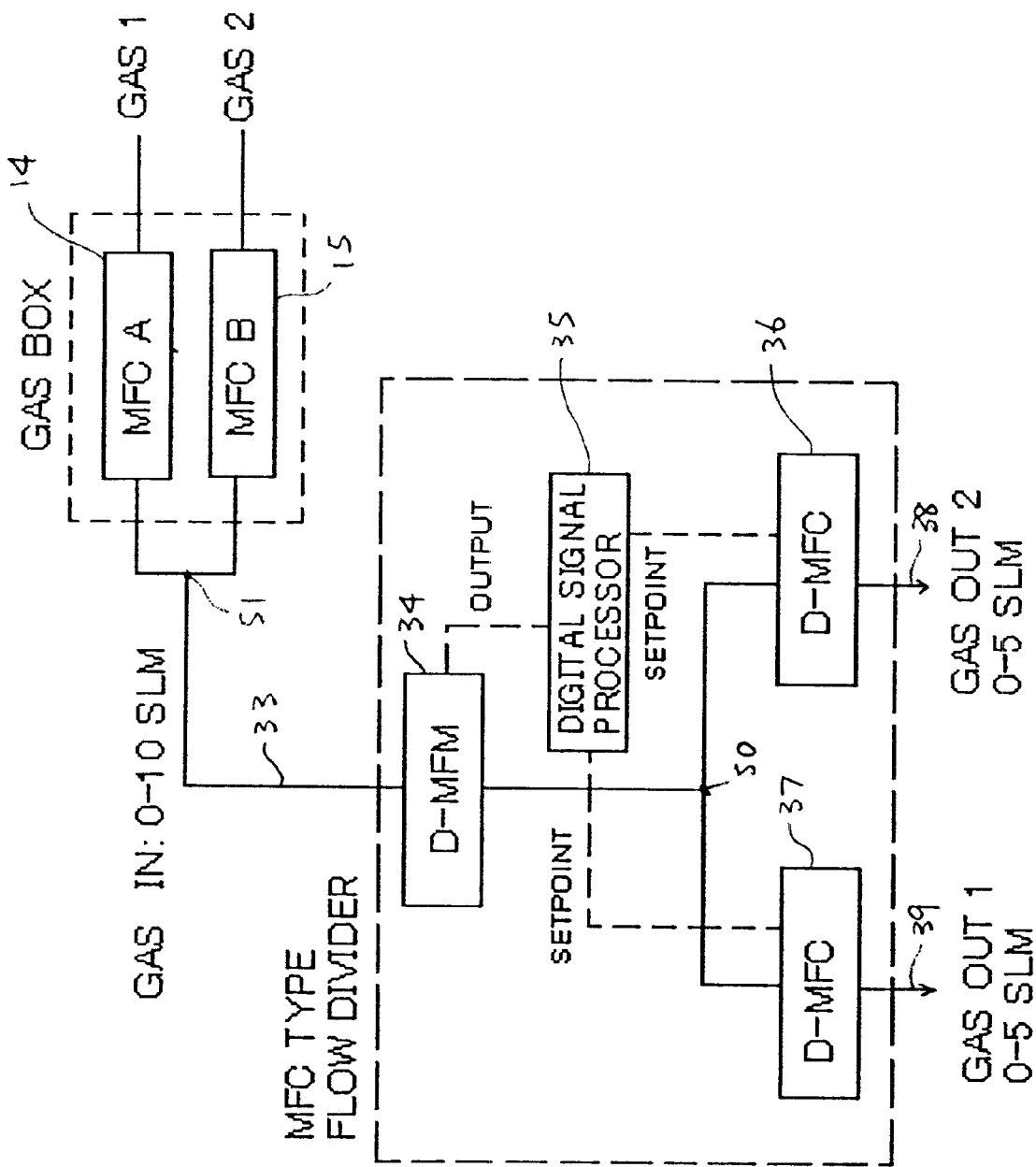
FIG. 3 is a diagram showing the second embodiment of a flow-divider means according to the present invention.

FIG. 3 shows the second embodiment in which a digital MFM and digital MFCs are used for a flow-divider means shown in FIG. 2. A flow-divider means 30 has an input port 33 on the primary side and output ports 38 and 39 on the secondary side. The flow-divider means 30 comprises one digital mass flow meter 34 (D-MFM) connected with the input port 33 on the primary side, two digital mass flow controllers 36 and 37 (D-MFC) provided on each line branching off from the D-MFM 34, and an electrically connected digital signal processor 35 provided between the D-MFM 34 and D-MFCs 36 and 37.

The operation of the embodiment shown in FIG. 1 is described below. When the vacuum exhaust valves 10 and 11 are opened and air inside reactors 3 and 4 is evacuated, two sheets of semiconductor substrates are simultaneously loaded. Subsequently, gas stop valves 8 and 9 are opened and a source gas is brought inside the reactors. At this time, using a combination of the flow-divider means 2 and APCs 6 and 7, source gases are brought in equal amounts into the reactors. By applying high-frequency voltage on the semiconductor substrates inside the reactors by RF generators 12 and 13, deposition simultaneously occurs inside the reactors.

In the embodiment shown in FIG. 1, pressure is controlled by an APC for each reactor and gas inside each reactor is discharged using a single pump. By using the independent pressure control and the above-mentioned flow-divider means, deposition can be controlled independently in the same manner as when a gas line for each reactor is used, hence individual differences between processing chambers can be accommodated. Additionally, because each reactor has a gas stop valve and a vacuum exhaust valve, processing using one reactor only can be performed. Furthermore, because a gas-line system comprises one gas line and one exhaust line for two reactors, less labor, lower costs and a smaller footprint can be achieved.

A method for using a gas-line system according to the present invention is described below. To use a gas-line system for a semiconductor-manufacturing apparatus with at least two reactors, first, a gas flow of each source gas is controlled using MFCs 14 and 15 on the primary side of a flow-divider means (preferably, they are included inside the gas source.). Subsequently, source gases which are mixed on the primary side using the flow-divider means 2 are equally distributed to two output ports on the secondary side. After the source gas is brought into each reactor, pressure inside each reactor is controlled at a desired pressure by an APC.

To divide a flow using a flow-dividing means, when a flow-divider 20 shown in FIG. 2 is used, the flow rate of each source gas controlled and mixed by MFCs 14 and 15, which flows in an input port 23 on the primary side and is measured by an MFM 24. The measured value is then converted into an analog signal by an analog signal converter 25. The signal is Subsequently transmitted to MFCs 26 and 27, respectively. Lastly, the MFCs 26 and 27 receive the signal and pass to output ports 28 and 29 on the secondary side, respectively, 50% of a flow rate brought into the input port 23 on the primary side.

When a flow-divider 30 shown in FIG. 3 is used as a flow-divider means, first, the flow rate of each source gas, which has been controlled and mixed by MFCs 14 and 15 and then flows in an input port 33 on the primary side, is measured by a D-MFM 34. Subsequently, a measured value is converted into a digital signal by a digital signal converter 35. The digital signal is then transmitted to D-MFCs 36 and 37, respectively. Lastly, the MFC's 36 and 37 receive the signal and pass to output ports 38 and 39 on the secondary side, respectively, 50% of a flow rate brought into the input port 33 on the primary side.

Using a method according to the present invention, with a combination of a flow-divider means according to the present invention and APCs, it is possible to consistently distribute exactly the same flow rate on the primary side to the secondary side, hence an excellent flow-dividing balance can be achieved. As a result, processes inside two reactors are very stable, and throughput improves.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A gas-line system for a semiconductor-manufacturing apparatus with at least two reactors, which comprises:
    a source gas line derived from at least one gas source;
    at least two branch gas lines leading to the respective reactors; and
    a flow divider for equally distributing the gas passing through the source gas line into each branch gas line, said flow divider comprising (i) an input port connected to the source gas line wherein a gas passes therethrough at a primary side flow rate, and (ii) at least two output ports connected to the respective branch gas lines wherein a gas passes through each branch gas line at a secondary side flow rate,
    wherein said flow divider comprises:
        at least two flow controllers for setting the respective secondary side flow rates, disposed at the respective output ports:
        a flow meter for detecting the primary side flow rate, disposed at the input port; and
        a signal processor for receiving a signal of the primary side flow rate from the flow meter and outputting a signal of the secondary side flow rate to each flow controller to equally set each secondary side flow rate.

2. The gas-line system according to claim 1, wherein the signal of the primary side flow rate and the signal of the secondary side flow rate are analog signals.

3. The gas-line system according to claim 1, wherein the signal of the primary side flow rate and the signal of the secondary side flow rate are digital signals.

4. A gas-line system for a semiconductor-manufacturing apparatus with at least two reactors, which comprises:
    a source gas line derived from at least one gas source;
    at least two branch gas lines leading to the respective reactors; and
    a flow divider for equally distributing the gas passing through the source gas line into each branch gas line, said flow divider comprising (i) an input port connected to the source gas line wherein a gas passes therethrough at a primary side flow rate, and (ii) at least two output ports connected to the respective branch gas lines wherein a gas passes through each branch gas line at a secondary side flow rate,
    wherein said flow-divider means comprises one digital mass flow meter connected with said input port on the primary side, two digital mass flow controllers provided on each line branching off from said digital flow meter, and an electrically connected digital signal processor provided between said digital mass flow meter and said digital mass flow controllers.

5. The gas-line system according to claim 1, further comprising a flow controller provided on the source gas line.

6. The gas-line system according to claim 1, wherein at least two gas sources are connected to the source gas line, wherein said system further comprises at least two origin source gas lines connecting between the respective gas sources and the source gas line, each origin source gas line being provided with a flow controller.

7. A gas-line system for a semiconductor-manufacturing apparatus with at least two reactors, which comprises:
    a source gas line derived from at least one gas source;
    at least two branch gas lines leading to the respective reactors; and
    a flow divider for equally distributing the gas passing through the source gas line into each branch gas line, said flow divider comprising (i) an input port connected to the source gas line wherein a gas passes therethrough at a primary side flow rate, and (ii) at least two output ports connected to the respective branch gas lines wherein a gas passes through each branch gas line at a secondary side flow rate,
    said gas-line system further comprising an exhaust pump for exhausting each reactor, disposed downstream of the reactors, wherein a pressure control valve is provided between each reactor and the exhaust pump to control gas flow of each reactor.

8. The gas-line system according to claim 7, wherein the pressure control valve is an auto pressure control (APC) butterfly valve.

9. The gas-line system according to claim 7, further comprising a gas stop valve provided between the flow divider and each reactor.

10. The gas-line system according to claim 7, further comprising a vacuum exhaust valve provided upstream of each pressure control valve.

11. A gas-line system for a semiconductor-manufacturing apparatus with at least two reactors, which comprises:
    a source gas line derived from at least one gas source;
    at least two branch gas lines leading to the respective reactors;
    a diverging point where the branch gas lines branch off from the source gas line; a flow rate detecting device provided on the source gas line;
    at least two flow rate adjusting devices provided on the respective branch gas lines; and
    a controlling device which sets a setpoint of each flow rate adjusting device based on a signal from the flow rate detecting device to equally distribute a gas passing through the source gas line into each branch gas line.

12. The gas-line system according to claim 11, wherein the flow rate detecting device outputs an analog signal to the controlling device which then outputs an analog signal to each flow rate adjusting device.

13. The gas-line system according to claim 11, wherein the flow rate detecting device outputs a digital signal to the controlling device which then outputs a digital signal to each flow rate adjusting device.

14. The gas-line system according to claim 11, wherein at least two gas sources are connected to the source gas line, wherein said system further comprises at least two origin source gas lines connecting between the respective gas sources and the source gas line, and a merging point where the origin source gas lines merge into the source gas line.

15. The gas-line system according to claim 11, further comprising an exhaust pump for exhausting each reactor, disposed downstream of the reactors, wherein a pressure control valve is provided between each reactor and the exhaust pump to control gas flow of each reactor.

16. A method for equally distributing a source gas into at least two reactors for semiconductor processing, comprising the steps of:

detecting the flow rate of the source gas derived from a gas source;

calculating an equally divided flow rate for the respective reactors;

diverging the source gas into each reactor; and setting a flow rate between the diverging point and each reactor at the equally divided flow rate.

17. The method according to claim 16, further comprising controlling the pressure of each reactor by a single exhaust pump and a pressure control valve provided between each reactor and the exhaust pump.

18. The method according to claim 16, wherein the detected flow rate of the source gas is processed into an analog signal which is used to calculate the equally divided flow rate, and based on an analog signal of the equally divided flow rate, the flow rate is set downstream of the diverging point.

19. The method according to claim 16, wherein the detected flow rate of the source gas is processed into a digital signal which is used to calculate the equally divided flow rate, and based on a digital signal of the equally divided flow rate, the flow rate is set downstream of the diverging point.

20. The method according to claim 16, wherein at least two gas sources are used, and said system further comprises setting a flow rate between each gas source and a merging point where the source gases are mixed, said merging point being upstream of the diverging point, wherein the flow rate between the merging point and the diverging point is detected.

* * * * *